WILLIAM A. ELLMORE
INVENTOR.

BY James H. Griffin
ATTORNEY

WILLIAM A. ELLMORE
INVENTOR.

BY James H. Griffin

ATTORNEY

Aug. 9, 1966 W. A. ELLMORE 3,265,318

MAGNETIC TAPE MACHINE

Filed May 4, 1964 5 Sheets-Sheet 3

WILLIAM A. ELLMORE
INVENTOR

BY James H. Griffin

ATTORNEY

WILLIAM A. ELLMORE
INVENTOR

BY James H. Griffin
ATTORNEY

WILLIAM A. ELLMORE
INVENTOR.
BY James H. Griffin
ATTORNEY

United States Patent Office 3,265,318
Patented August 9, 1966

3,265,318
MAGNETIC TAPE MACHINE

William A. Ellmore, Saratoga, Calif., assignor to Ampex Corporation, Redwood City, Calif., a corporation of California Filed May 4, 1964, Ser. No. 364,666
11 Claims. (Cl. 242—74)

This invention relates in general to magnetic tape recorders and more particularly to improved means for threading the tape on take-up reels thereof.

The improved threading means will be described in connection with a magnetic tape recorder, but it is to be understood that the invention may be applied to apparatus of any type wherein it is necessary to affix some material to be wound to a take-up reel in a quick and easily detachable manner. Present tape recorders have two turntables which mount supply and take-up reels upon which the tape is wound. To begin the operation of such a machine, a length of tape from the supply reel must be positioned in proper relation with the magnetic transducer head and a tape driving capstan, and must then be engaged with the take-up reel. This initial "threading" operation involves considerable manual handling of the tape, which at times is objectionable. While threading is not difficult for professional or more skilled users, it does present sufficient complication to handicap the sale of magnetic tape recorders for home use. To minimize the difficulty of threading operations, tape recorders of the magazine type have been used which employ a tape of the endless loop type or tape holding means incorporating both tape supply and take-up devices. Such machines have objectionable features which have prevented their wide application. The types of magazines employed have imposed limitations upon the length of the tape. With a magazine holding an endless loop, a reverse rewind operation is difficult, if not impossible. Since the tape guiding and driving means for use with such magazines are radically different from conventional designs, it is difficult to obtain high fidelity performance. Also, such magazines cannot be used with magnetic recording and/or reproducing machines of the more conventional type without considerable alteration.

Prior developments for improving the threading operation have involved the use of special leaders—hooks, strips of felt, loops in the tape, special stiff or wide portions, and the like—which are expensive to manufacture, are not standardized throughout the range of tape recorders in use, and are subject to failure after undergoing various amounts of wear and tear.

Accordingly, the general object of this invention is to provide improved means for threading the take-up reel of a magnetic tape recorder or other device.

Another object of this invention is to provide means for performing the threading operation which do not require the use of any special leader or prepared portion of the tape or other material associated with the take-up reel, whereby simple rotation of the take-up reel serves to effect automatic and reliable threading of the tape.

Another object of this invention is to provide means for fixing tape to the take-up reel which does not impede an automatic rewind of the tape back onto the supply reel.

In accordance with the above objects and as a feature of applicant's invention, there is provided a take-up hub having a circular or other shaped base with teeth of a height exceeding the width of the tape. Optionally, the reel may have a single (bottom) flange, but a flange is not necessary, since the tape should not contact the flange during operation. This improved take-up reel appears in the usual position on the take-up turntable of the machine and may be removable, but need not be. The shape of the teeth used should be such that an edge or surface perpendicular to the flat upper face of the base faces both outward from the base (for the tape to wind on) and forward in the direction of rotation (to hold the tape against the hub without upward slippage once windup begins). As another feature of applicant's invention, a cover may be placed over the improved take-up reel and a slot provided therein through which the tape may be dropped. As another feature of applicant's invention, to facilitate threading the improved take-up reel when the machine is not in a horizontal position, yielding holding means are provided to hold the tape across the take-up reel.

Other objects and features of this invention and a fuller understanding thereof may be had by referring to the following description and claims taken in conjunction with the accompanying drawings, in which:

Figure 1:
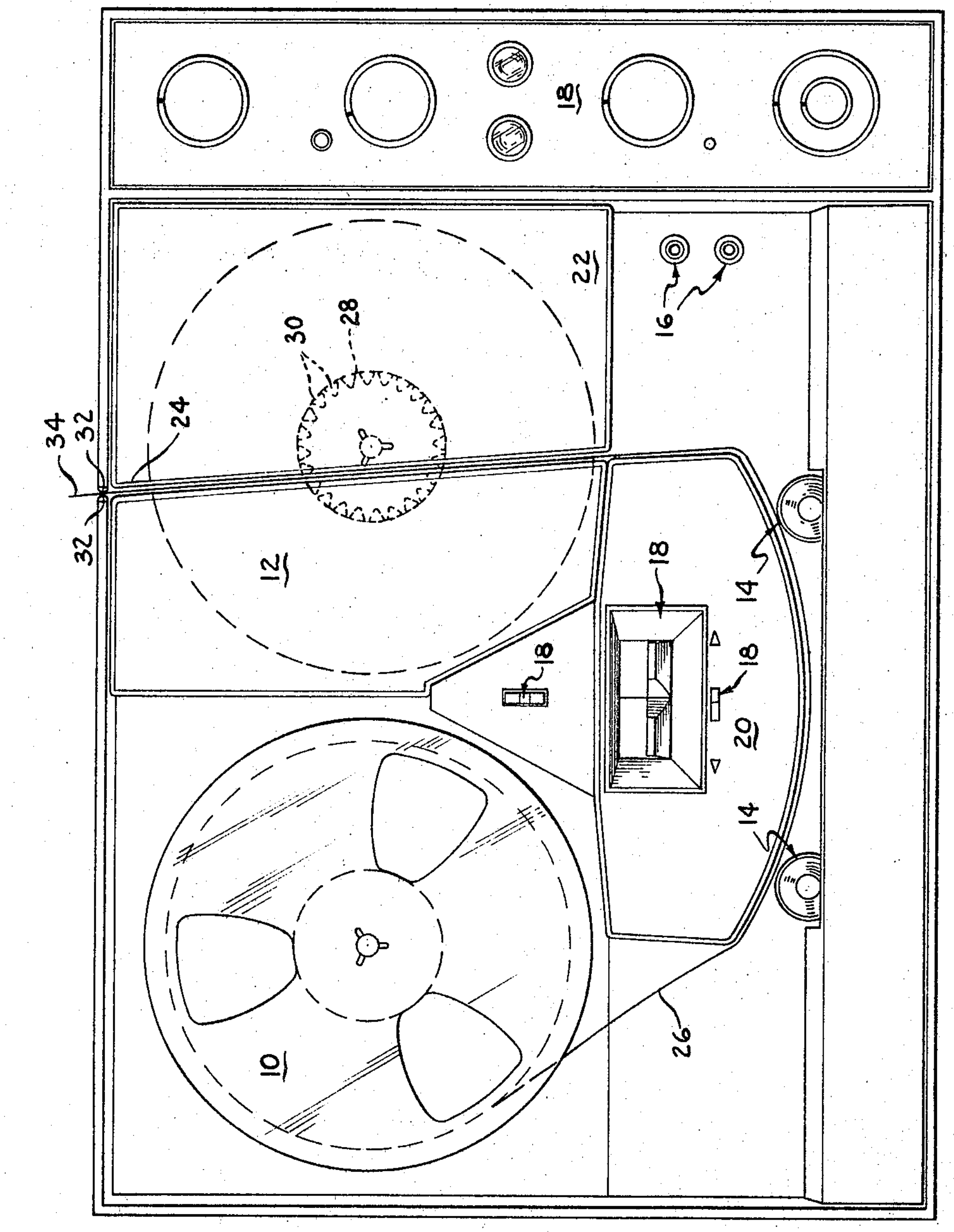
FIGURE 1 is a plan view of a magnetic tape recorder whereon the take-up reel of applicant's invention might be used.

Referring to FIGURE 1, a tape recorder upon which a preferred embodiment of applicant's invention is shown has a supply reel 10, a take-up reel 12, pinch rollers 14 (which work in conjunction with capstans, not shown), jacks 16, and controls and control panels denoted wherever they appear by the number 18. The various record and reproduce and erase heads of the tape recorder are under a housing 20. Another housing 22 covers the take-up reel which is secured to a turntable by suitable holding means in a conventional manner. As a feature of applicant's invention, the housing 22 has a slot 24 through which a tape 26 may be dropped into position on a hub 28 having teeth 30 on the take-up reel 12. In the preferred embodiment described in detail herein, two pieces of electrostatically flocked metal, plastic, or the like 32 serve as yielding holding means to hold the leading end 34 of the tape 26 in position across the hub 28, an expedient which is especially necessary when the tape recorder is not lying flat. The flocked pieces 32 have flock long enough that the tips from opposite sides interlace slightly and resilient enough that the tape can enter edgewise very easily and be held just enough to function as described hereinafter.

Figure 2A:
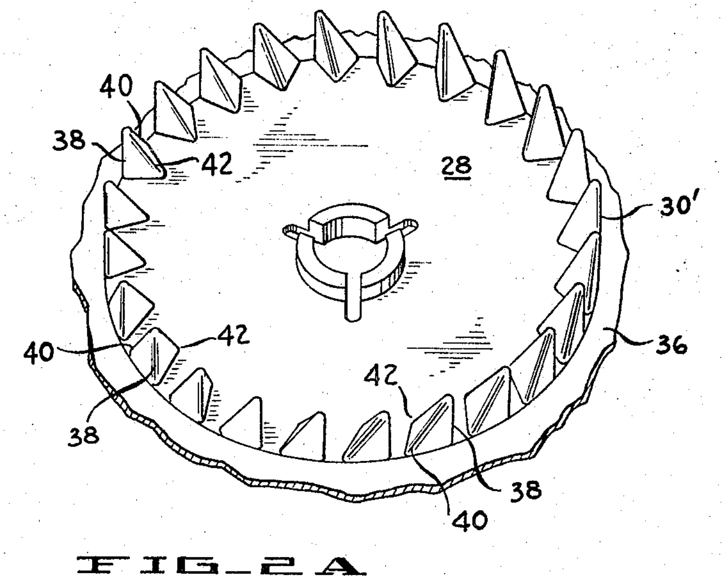
FIGURE 2A is a perspective view of a tetrahedron-toothed take-up hub according to applicant's invention.
Figure 2B:
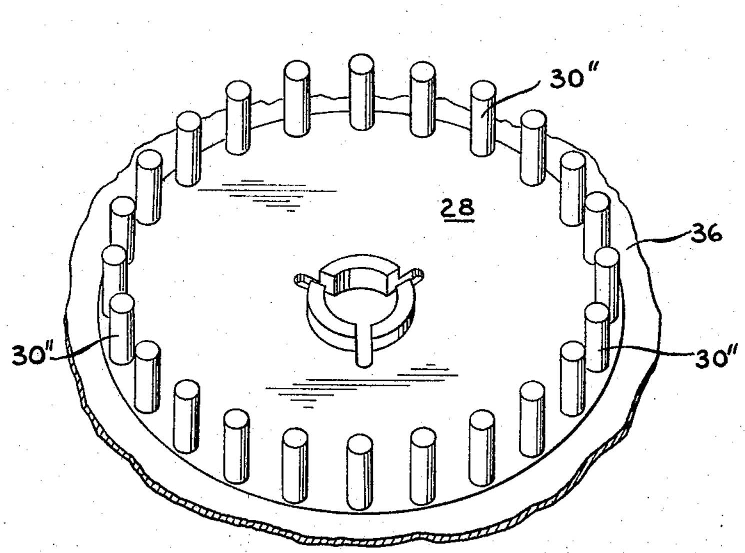
FIGURE 2B is a perspective view of a spike-toothed take-up hub according to applicant's invention.

Referring to FIGURE 2A, the take-up hub which is a feature of applicant's invention is shown in one preferred form as a circular hub with tetrahedral teeth 30′. FIGURE 2B shows another preferred form of the hub which is a circular hub with spiked teeth 30″. Both embodiments work equally well in operation, but the tetrahedral tooth permits die-casting each hub as one unit, whereas the spiked teeth must be inserted individually after casting, a prohibitively expensive operation. Moreover, a tetrahedral shape permits better rounding of the top (for ensuring falling of the tape regardless of where it hits) and provides far better bracing against the heavy inward pressure of the wound-up tape. This latter point is very important: many hub designs in the past have developed weak points which collapsed in some degree. Even the smallest such collapse produced permanent striations where the tape was stretched beyond its elastic limit. Especially at high frequencies the final result would be dropouts, which are greatly detrimental in instrumentation and digital applications.

Figure 3A:
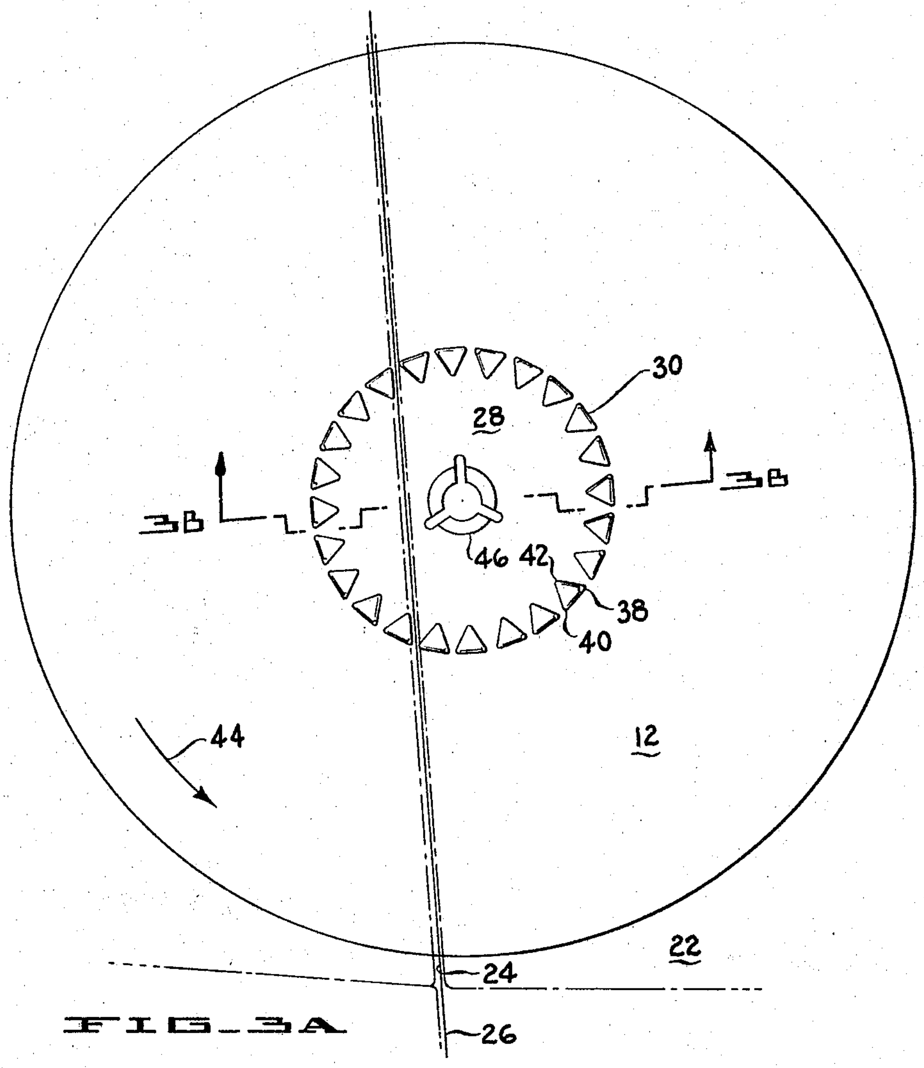
FIGURE 3A is a plan view of the improved take-up hub with flange attached.
Figure 3B:
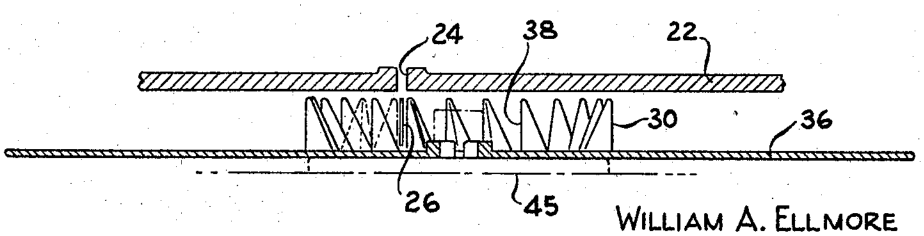
FIGURE 3B is a side elevation section on line 3B—3B of the improved take-up reel through the center hub thereof as shown in FIGURE 3A.

Referring also to FIGURES 3A and 3B, it will be seen that the take-up reel 12 which is a feature of applicant's invention has but one flange 36 rather than the usual two flanges found in most supply and take-up reels. Even this bottom flange is not strictly necessary, for the tape should not contact it when the reel is in rotation. It will also be seen that the tetrahedral form of teeth 30 have leading edges 38 perpendicular to the flange 36. The other two edges 40 and 42 of each tetrahedron are, of course, at an acute angle to the flange 36. Each tetrahedron is placed in such manner that its perpendicular edge 38 will be in the lead when the take-up reel is rotating in the direction shown by the arrow 44 (counterclockwise), the direction of rotation contemplated when the take-up reel is winding up tape. FIGURES 3A and 3B also show the turntable 34 on which the take-up reel 12 rests and the reel holding mechanism 46 associated therewith.

Figures 4, 5:
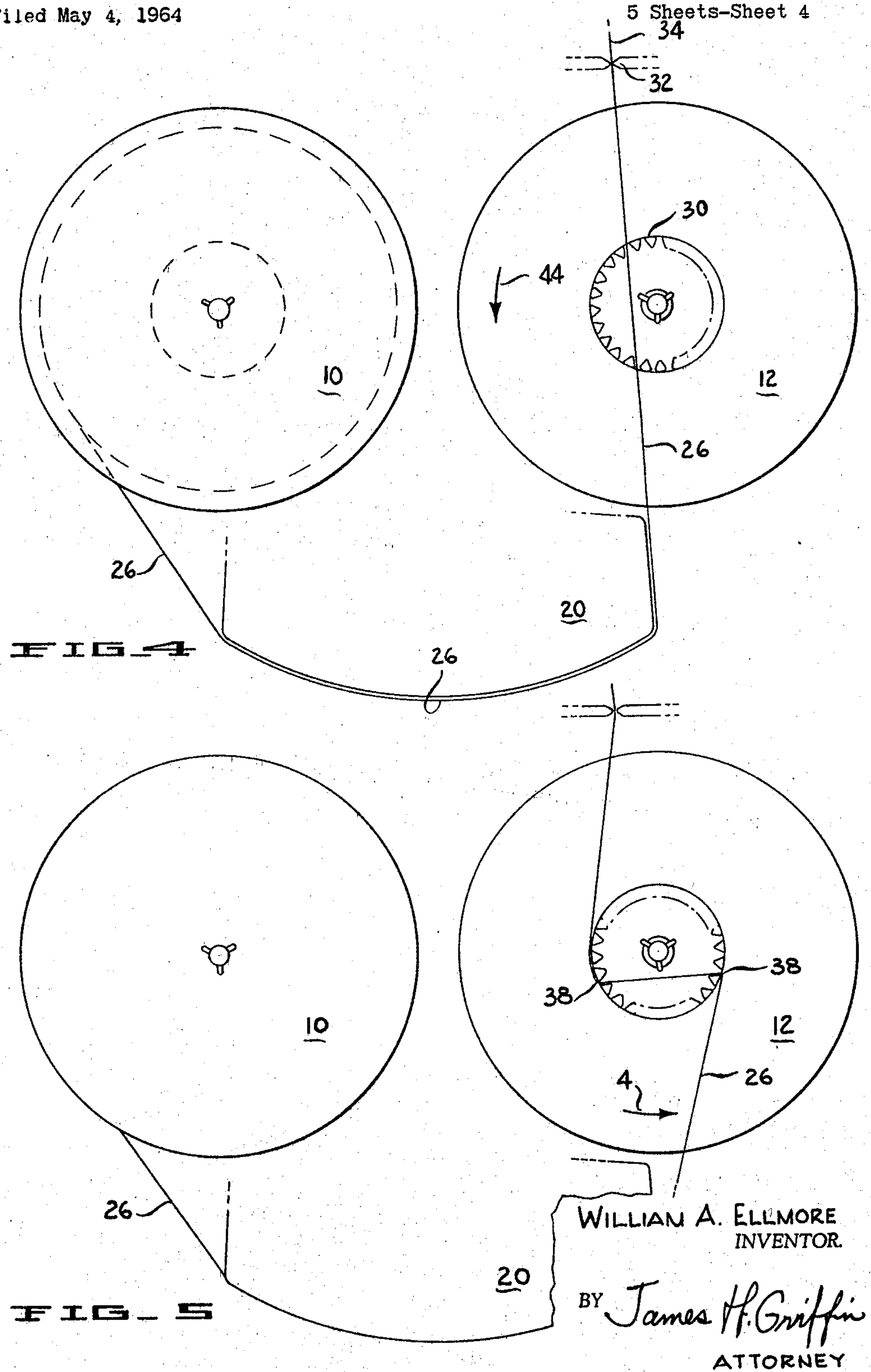
FIGURE 4 is a plan view of the tape supply and take-up reels of the machine of FIGURE 1 showing the tape in position just after the threading operation has been completed.
FIGURE 5 is a view similar to that of FIGURE 4 but showing the tape after the take-up reel has gone through a small amount of revolution.
Figure 6:
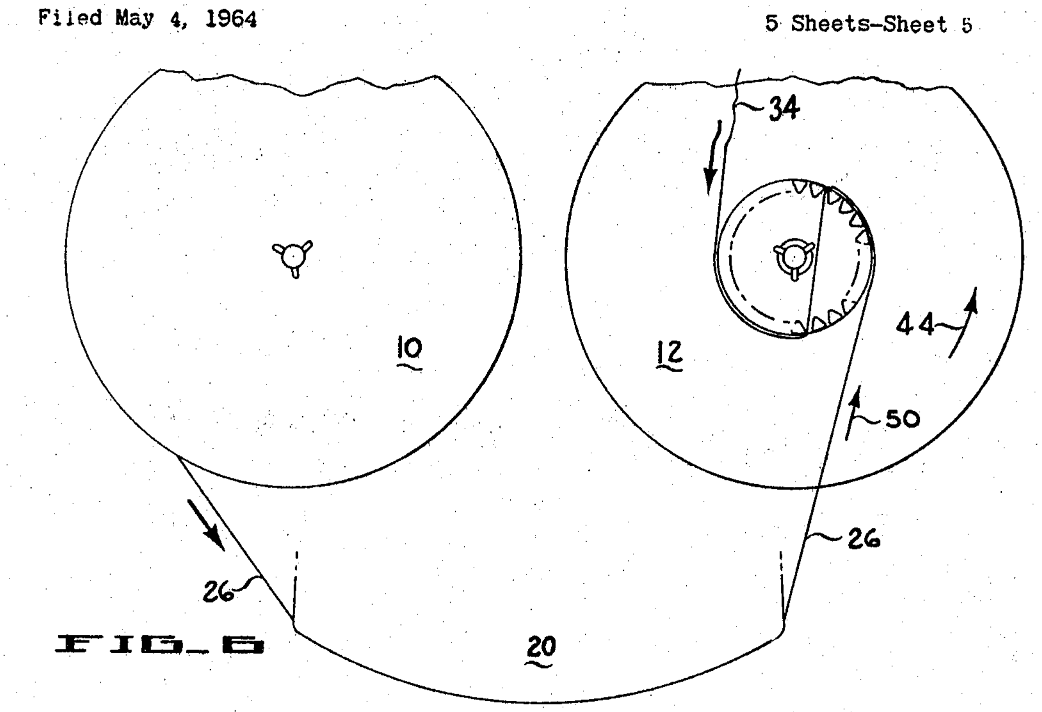
FIGURE 6 is a view similar to that of FIGURE 4 but showing the tape after the take-up reel has gone through about a half revolution.
Figure 7:
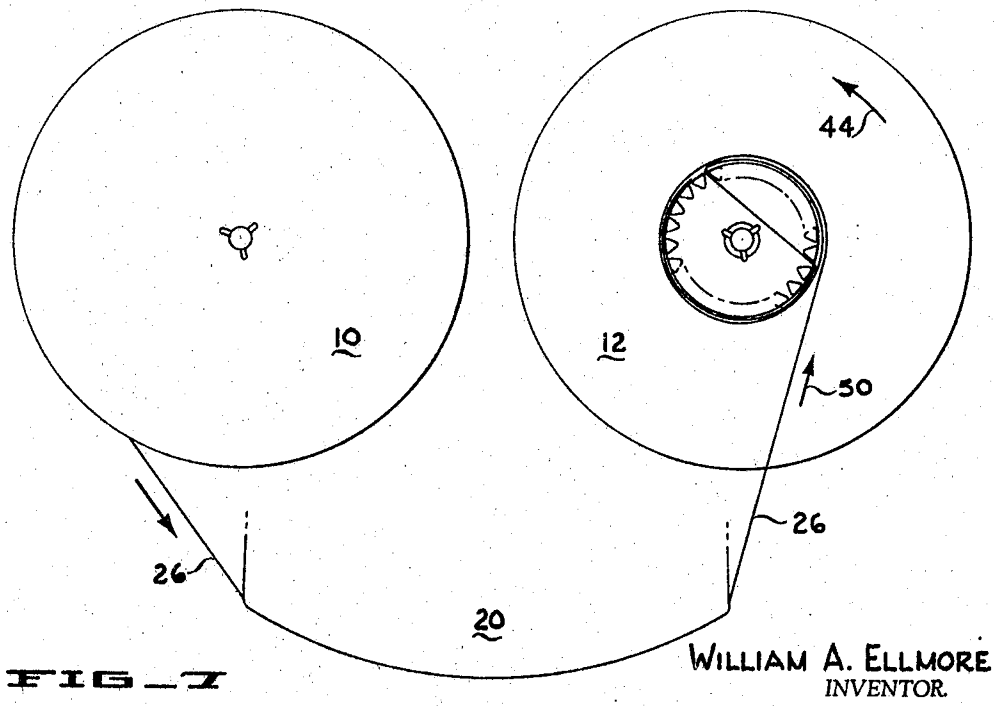
FIGURE 7 is a view similar to that of FIGURE 4 but showing the tape after the take-up reel has gone through several revolutions.

In the performance of the threading operation to which applicant's invention is directed, the tape 26 is stored in the supply reel 10 which is placed upon the tape recorder. The leading edge 34 of the tape 26 drawn around the front of housing 20 and thereafter is pulled to the position shown in FIGURE 4 and dropped through the slot 24 on the take-up reel cover 22. If the tape recorder is not lying flat, the leading edge 34 may be slipped through the holding means 32. In either case, the tape 26 will be led along the back face of the tetrahedron (i.e., the face between the edges 40 and 42) until it comes to rest on the flange 36 or on the face of the hub 28. At this point the threading operation per se is complete and the tape is in the position shown in FIGURE 4. Immediately upon rotation of the reels 10 and 12 in the direction shown by the arrow 44, the tape 26 is forced against the perpendicular leading edges 38 of whichever two teeth it happens to be adjacent to. Due to the perpendicularity of the edges 38, the tape cannot escape upward under their pressure; and, with or without the holding means 32, the friction of the tape 26 against the edges 38 prevents significant slippage in the longitudinal direction, since the feedthrough by the tape recorder of added tape from the supply reel 10 ensures that little or no backward pull will exist. After the take-up reel has gone through about half a revolution as shown in FIGURE 6, the tape 26 is ready to double over itself and the leading edge 34 has then pulled free of the holding means 32. Soon the tape is doubled over itself one or more times as shown in FIGURE 7 and will be held securely on the take-up reel 12 until such time as it is rewound back onto the supply reel 10. In the rewind operation, the tape goes in the direction opposite to that shown by the arrow 50 and ultimately the position as shown in FIGURE 4 is reached, save that the leading edge 34 is not between the holding means 32. At this point the tape 26 is simply pulled through the teeth 30 and onto the supply reel 10.

Although the invention has been described in its preferred form with a certain degree of particularity, it is to be understood that the present disclosure of the preferred form has been made only by way of example and that numerous changes in the details of construction and the combination and arrangements of parts may be resorted to without departing from the spirit and the scope of the invention as hereinafter claimed.

What is claimed is:

1. A take-up hub for a magnetic tape recorder comprising: a circular base and spaced teeth mounted around the circumference of the base, each tooth having the shape of a tetrahedron and having one edge perpendicular to the base.

2. A take-up mechanism for a magnetic tape recorder comprising: a take-up reel flange, a circular hub at the center of the flange, spaced teeth mounted around the circumference of the hub, a covering mounted over the take-up reel, and a slot in the covering extending along a chord of said circumference which at its opposite ends intersects corresponding surface portions of pairs of said teeth at points lying on said circumference whereby tape can both be wound onto the take-up reel through the slot and be initially positioned between one of said pairs of teeth on the hub therethrough and holding means at the opposite end of the slot from where the tape enters for holding the tape yieldingly after it has been initially positioned.

3. A take-up mechanism for a magnetic tape recorder comprising: a take-up reel flange, a circular hub at the center of the flange, and spaced teeth mounted around the circumference of the hub, said teeth having a height exceeding the width of magnetic tape to be taken up by the reel, each tooth having one edge perpendicular to the flange, each chord of the circle defined by said circumference which at its opposite ends intersects corresponding surface portions of a pair of said teeth at points lying on said circumference extending through an unobstructed region overlying said hub.

4. A take-up mechanism for a magnetic tape recorder comprising: a take-up reel flange, a circular hub at the center of the flange, spaced teeth mounted around the circumference of the hub, each tooth having the shape of a tetrahedron and having one edge perpendicular to the flange, a covering mounted over the take-up reel, a slot in the covering so positioned that tape can both be wound onto the take-up reel therethrough and be initially positioned between the teeth on the hub therethrough, and holding means at the opposite end of the slot from where the tape enters for holding the tape yieldingly after it has been initially positioned.

5. A take-up mechanism for a magnetic tape recorder comprising: a take-up reel flange, a circular hub at the center of the flange, spaced teeth mounted around the circumference of the hub, each tooth having the shape of a tetrahedron and having one edge perpendicular to the flange, a covering mounted over the take-up reel, and a slot in the covering so positioned that tape can both be wound onto the take-up reel therethrough and be initially positioned between the teeth on the hub therethrough.

6. A take-up mechanism for a magnetic tape recorder comprising: a take-up reel flange, a circular hub at the center of the flange, spaced teeth mounted around the circumference of the hub, each tooth having the shape of a tetrahedron and having one edge perpendicular to the flange, a covering mounted over the take-up reel, a slot in the covering so positioned that tape can both be wound onto the take-up reel therethrough and be initially positioned between the teeth on the hub therethrough, and two pieces electrostatically flocked material at the opposite end of the slot from where the tape enters for holding the tape yieldingly after it has been initially positioned.

7. A take-up hub for a magnetic tape recorder comprising: a base, peripherally disposed teeth of a height exceeding the width of a magnetic tape to be used in said recorder and projecting from a circle on the base, each chord of said circle which at its opposite ends intersects corresponding surface portions of a pair of said teeth at points lying on said circle extending through an unobstructed region overlying said base, and means for attaching the base to a turntable on the tape recorder.

8. A take-up hub for a magnetic tape recorder comprising: a circular, flat-topped base, peripherally disposed teeth mounted on the base, each of said teeth of a height exceeding the width of a magnetic tape to be used in said recorder having both a portion outermost from the center of the hub and a portion circumferentially forwardmost when the hub is taking up tape which are perpendicular to the top of the base and lie on a circle thereof, each chord of said circle which intersects said portions of a pair of said teeth extending through an unobstructed region overlying said base, and means for attaching the base to a turntable on the tape recorder.

9. A take-up hub for a magnetic tape recorder comprising: a circular, flat-topped base, peripherally disposed teeth mounted on the base, each of said teeth being tetrahedral in form with one of the outermost edges of the tetrahedron being perpendicular to top of the base, and means for attaching the base to a turntable on the tape recorder.

10. A take-up hub for a magnetic tape recorder comprising: a circular, flat-topped base, peripherally disposed teeth mounted on the base, each of said teeth being tetrahedral in form with one of the outermost edges of the tetrahedron being perpendicular to the top of the base, means for attaching the base to a turntable on the tape recorder, a covering mounted over the take-up reel, a slot in the covering so positioned that tape can both be wound onto the take-up reel therethrough and be initially positioned between the teeth on the hub therethrough, and two pieces of electrostatically flocked material at the opposite end of the slot from where the tape enters for holding the tape yieldingly after it has been initially positioned.

11. A take-up hub comprising a base having a plurality of circumferentially spaced teeth projecting from a circle thereon and having a height exceeding the width of a magnetic tape to be taken up by the hub, each chord of said circle which at its opposite ends intersects a corresponding surface portion of a pair of said teeth at points lying on said circle extending through an unobstructed region overlying said base.

References Cited by the Examiner

UNITED STATES PATENTS

| | | | |
|---|---|---|---|
| 1,127,931 | 2/1915 | Smith | 242—74 X |
| 2,991,955 | 7/1961 | Post | 242—74 |
| 3,003,712 | 10/1961 | Dalton | 242—74 |

MERVIN STEIN, *Primary Examiner.*

N. L. MINTZ, *Assistant Examiner.*